US006482246B1

(12) United States Patent
Dyson et al.

(10) Patent No.: US 6,482,246 B1
(45) Date of Patent: Nov. 19, 2002

(54) CYCLONIC SEPARATING APPARATUS WITH TANGENTIAL OFFTAKE CONDUIT

(75) Inventors: James Dyson, Little Somerford (GB); Simeon Charles Jupp, Broughton Gifford (GB); Andrew MacLeod, Sandy (GB)

(73) Assignee: Dyson Limited, Wiltshire (GB)

( * ) Notice: Subject to any disclaimer, the term of this patent is extended or adjusted under 35 U.S.C. 154(b) by 0 days.

(21) Appl. No.: 09/830,342

(22) PCT Filed: Oct. 20, 1999

(86) PCT No.: PCT/GB99/03468

§ 371 (c)(1),
(2), (4) Date: Apr. 26, 2001

(87) PCT Pub. No.: WO00/24519

PCT Pub. Date: May 4, 2000

(30) Foreign Application Priority Data

Oct. 8, 1998 (GB) .............................................. 9823418

(51) Int. Cl.[7] ................................................ B01D 45/12
(52) U.S. Cl. ...................... 55/459.1; 55/460; 55/DIG. 3
(58) Field of Search ................................ 55/459.1, 460, 55/DIG. 3

(56) References Cited

U.S. PATENT DOCUMENTS 6,261,330 B1 * 7/2001 Dyson et al. ................. 55/345

FOREIGN PATENT DOCUMENTS

| | | | |
|---|---|---|---|
| DE | 1278203 | * | 9/1968 |
| EP | 0 134 654 | A1 | 3/1985 |
| EP | 0 636 338 | A2 | 2/1995 |
| GB | 0 520 322 | | 2/1939 |
| GB | 1 050 503 | | 12/1966 |
| GB | 2 194 208 | A | 3/1988 |
| GB | 2 249 272 | A | 5/1992 |
| WO | WO 84/02858 | | 8/1984 |

* cited by examiner

*Primary Examiner*—Robert A. Hopkins
(74) *Attorney, Agent, or Firm*—Morrison & Foerster LLP

(57) ABSTRACT

The invention provides cyclonic separating apparatus comprising a tapering cyclone having a larger end a smaller end, a fluid outlet located at the larger end of the cyclone, the fluid outlet becoming located coaxially with the cyclone, and a tangential offtake conduit communicating with the fluid outlet, wherein the distance between the tangential offtake conduit and the smaller end of the cyclone increases in the downstream direction of the tangential offtake conduit. Preferably, the tengential offtake conduit follows a substantially helical path. This reduces the turbulence created in the tangential offtake conduit and allows kinetic energy of the exiting fluid to be recovered as pressure energy.

17 Claims, 4 Drawing Sheets

CYCLONIC SEPARATING APPARATUS WITH TANGENTIAL OFFTAKE CONDUIT

TECHNICAL FIELD OF THE INVENTION

The invention relates to cyclonic separating apparatus. Particularly, but not exclusively, the invention relates to cyclonic separating apparatus for use in vacuum cleaners.

BACKGROUND OF THE INVENTION

Cyclonic separating apparatus in which particulate material is separated from a fluid, usually a gas, by means of high centrifugal forces is known. Such apparatus comprises a tapering cyclone body having a fluid inlet located at the larger end of the cyclone body and arranged to introduce fluid to the interior surface of the cyclone body in a tangential manner. The smaller end of the cyclone body is surrounded by a collector or, alternatively, leads to a particulate material outlet. A fluid outlet in the form of a vortex finder is located centrally of the larger end of the cyclone body. In use, the fluid inlet introduces the fluid with the particulate material entrained therein to the interior of the cyclone body in a tangential manner. The taper of the cyclone body causes the fluid to be accelerated down the length of the cyclone body which causes the particulate matter to be separated from the fluid and to collect in the collector or, if appropriate, to exit the apparatus via the material outlet. The fluid forms a vortex generally along the longitudinal axis of the cyclone body and exits the apparatus via the vortex finder at the centre of the larger end of the cyclone body.

When the exiting fluid passes through the vortex finder, it is spinning with a high angular velocity. If the offtake conduit leading from the vortex finder is linear with respect to the vortex finder (ie. the conduit has a central axis which is continuous with the central axis of the vortex finder), then the outgoing fluid will continue to spin as it travels along the conduit but will, eventually, revert to linear flow and the kinetic energy of the fluid flow associated with the spinning movement will be lost, probably in the form of frictional losses. Some attempt has been made to recover some of the kinetic energy of the spinning exiting fluid by utilising tangential offtakes from the vortex finder. The offtake is positioned so as to be tangential to one side of the vortex finder so that the spinning fluid enters the offtake in a linear manner. Examples of tangential offtakes used in conjunction with cyclonic separators are shown and described in the paper entitled "The Use of Tangential Offtakes for Energy Savings in Process Industries" by T. O'Doherty, M. Biffin and N. Syred (Journal of Process Mechanical Enginering, Vol. 206, Page 99ff). The arrangements shown and described in this paper attempt to convert some of the kinetic energy of the fluid flow into pressure energy. However, the pressure recovery is not wholly successful. This is partly due to the fact that the fluid flow exiting the cyclonic separator is still required to follow a path which contains sharp changes in direction. In the paper referred to above, the tangential offtakes are each located within a horizontal plane which requires the axial velocity component of the exiting fluid to be turned through a 90° angle in a short distance. This results in turbulent flow downstream of the vortex finder which leads to energy loss from the fluid.

One application of such separators is in vacuum cleaners in which dirt and dust particles are separated from an airflow within the vacuum cleaner so that, when dirty air is drawn into the cleaner, the dirt and dust particles are separated from the airflow and retained for disposal whilst clean air is expelled. Vacuum cleaners of this type are shown and described in various prior published patents, such as EP 0 042 723, EP 0 636 338 and EP 0 134 654. Recovery of a higher proportion of the kinetic energy of the fluid exiting the cyclonic separating apparatus would result in a vacuum cleaner having a higher efficiency and thus a better level of performance.

SUMMARY OF THE INVENTION

It is an object of the present invention to provide cyclonic separating apparatus in which a greater proportion of the kinetic energy of exiting fluid is recoverable. It is a further object of the present invention to provide cyclonic separating apparatus which, when incorporated into a vacuum cleaner, results in the vacuum cleaner performing with a higher efficiency and/or better performance.

The invention provides a cyclonic separating apparatus comprising a tapering cyclone having an axis, a larger end and a smaller end, a fluid inlet and a fluid outlet located at the larger end of the cyclone, the fluid outlet being located coaxially with the cyclone, and a tangential offtake conduit communication with the fluid outlet, wherein the distance, measured parallel to the axis, between the tangential offtake and the smaller end of the cyclone increases in the downstream direction of the tangential offtake conduit. Preferably, the tangential offtake conduit follows a substantially helical path downstream of the fluid outlet. Such an arrangement allows the fluid exiting the separating apparatus to be gradually turned through a required angle without imposing sharp changes of direction. This reduces the amount of turbelence induced in the fluid flow by virtue of the direction change and this in turn reduces energy loss through friction.

The invention provides cyclonic separating apparatus comprising a tapering cyclone having an axis, a larger end and a smaller end, a fluid inlet and a fluid outlet located at the larger end of the cyclone, the fluid outlet being located coaxially with the cyclone, and a tangential offtake conduit communicating with the fluid outlet, wherein the distance, measured parallel to the axis, between the tangential offtake and the smaller end of the cyclone increases in the downstream direction of the tangential offtake conduit. Preferably, the tangential offtake conduit follows a substantially helical path downstream of the fluid outlet. Such an arrangement allows the fluid exiting the separating apparatus to be gradually turned through a required angle without imposing sharp changes of direction. This reduces the amount of turbulence induced in the fluid flow by virtue of the direction change and this in turn reduces energy loss through friction.

The tangential offtake conduit preferably has a central axis which is inclined at an angle of between 35° and 70°, preferably 60°, to the longitudinal axis of the cyclone body. This arrangement turns the exiting fluid through a required angle without significantly increasing the possibility of separation occurring as the fluid passes through the tangential offtake conduit. It also allows the kinetic energy of the spinning fluid to be recovered as pressure energy which in turn results in the provision of a highly efficient system for separation of particles from a fluid.

In a preferred embodiment, a centerbody is located in the fluid outlet, which consists of a vortex finder. The tangential offtake conduit then communicates with an annular chamber delimited on the outside by the fluid outlet and on the inside by the centerbody. The arrangement of an annular chamber around the centerbody ensures that all of the exiting air is aligned with the tangential offtake conduit so that the amount of turbulence introduced at the entrance to the tangential offtake conduit is kept to a minimum.

BRIEF DESCRIPTION OF THE DRAWINGS

Embodiments of the invention will now be described, by way of example only, with reference to the accompanying drawings, wherein.

DETAILED DESCRIPTION OF THE INVENTION

Figure 1:
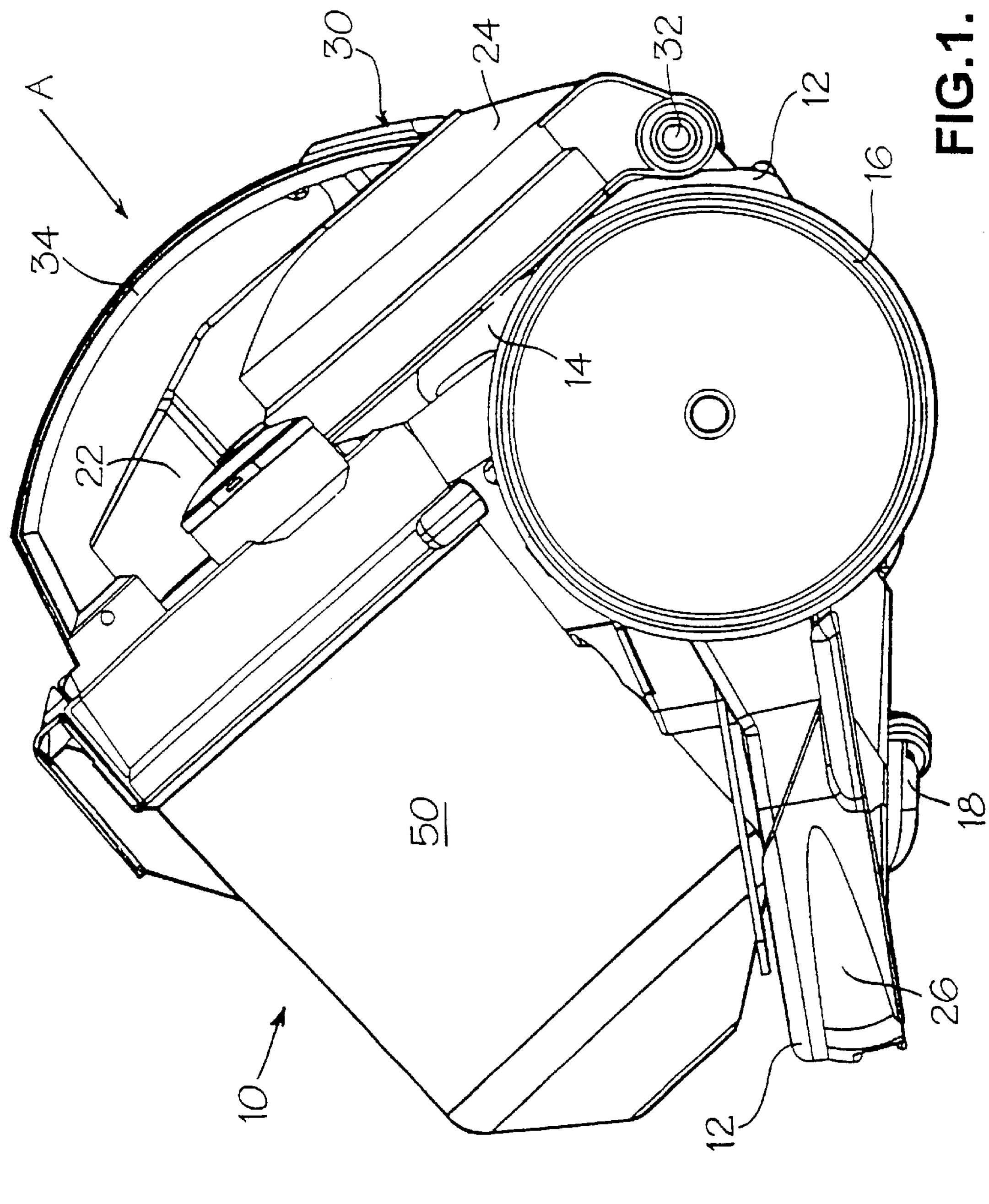
FIG. 1 is a side view of a vacuum cleaner incorporating cyclonic separating apparatus according to the invention.
Figure 2:
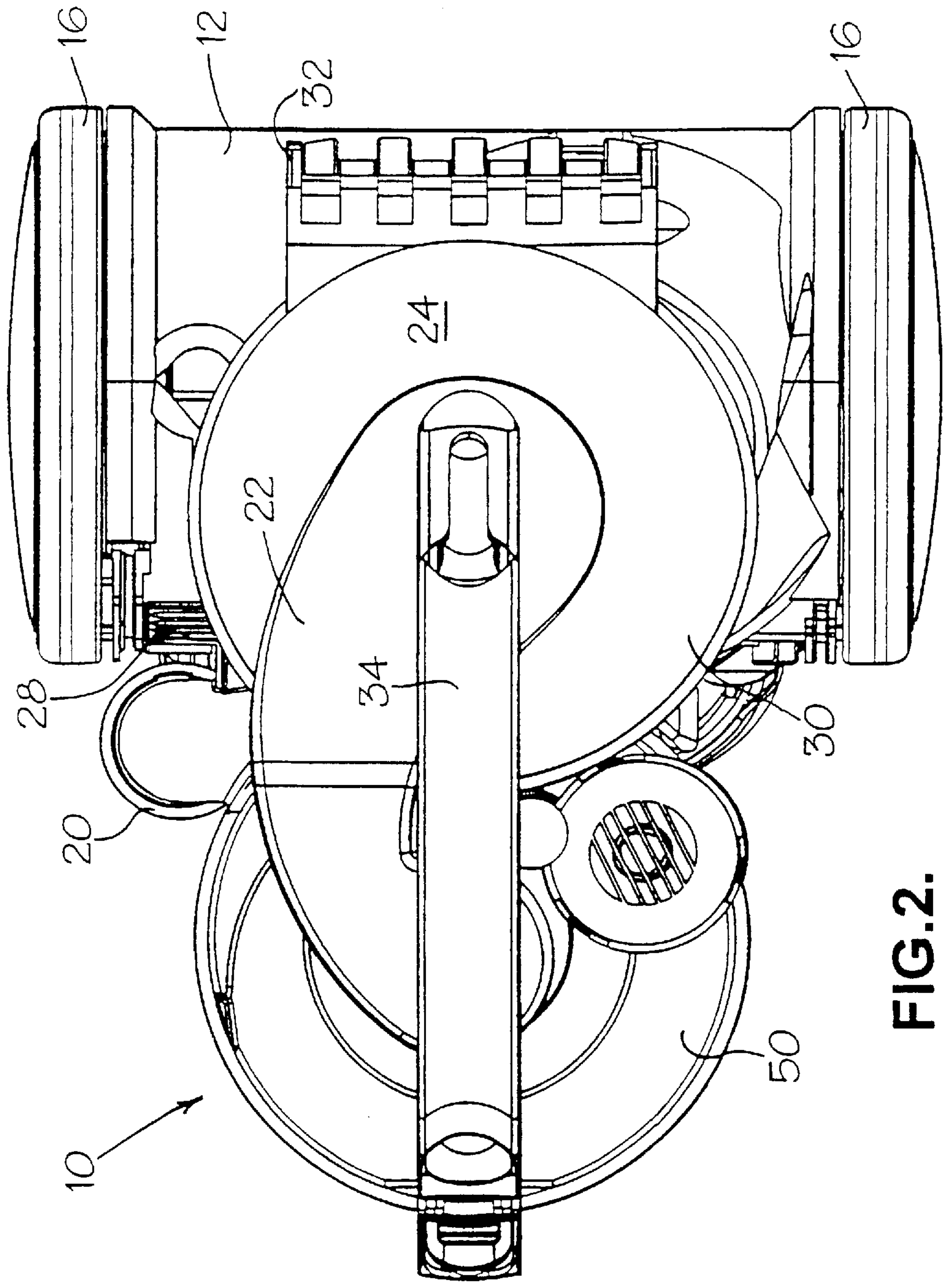
FIG. 2 is a view of the vacuum cleaner of FIG. 1 taken along arrow A.

Cyclonic separating apparatus according to the invention can be incorporated to good effect in a vacuum cleaner. A vacuum cleaner incorporating cyclonic separating apparatus according to the invention is shown in FIGS. 1 and 2. The vacuum cleaner 10 has a chassis 12 which supports a motor and fan unit 14 and cyclonic separating apparatus 50. Support wheels 16 are mounted on the chassis 12 towards the rear thereof and a castor wheel 18 is arranged beneath the chassis 12 towards the front thereof to allow the cleaner 10 to be maneouvred across a surface to be cleaned The motor and fan unit 14 is arranged substantially between the support wheels 16 to give the cleaner 10 a high degree of maneouvrability.

The cyclonic separating apparatus 50 is designed to effect the separation of dirt and dust particles from an airflow which is drawn into the cleaner 10 by the motor and fan unit 14. A hose (not shown) carrying a floor tool is connected to an air inlet 20 of the cyclonic separating apparatus 50 so that the dirty airflow can be drawn into the machine. The dirty air passes into the cyclonic separating apparatus 50 which operates in a known manner to extract, initially, larger dirt and fluff and, subsequently, finer dirt and dust particles from the airflow. The airflow from which dirt and dust has been extracted passes out of the cyclonic separating apparatus 50 and then to the motor and fan unit 14 via an offtake conduit 22. The airflow passes through the fan and around the motor so as to provide a cooling effect in a known manner. Pre- and post-motor filters (not shown) can be provided in housings 24, 26 in order to protect the motor and to prevent particulates released from the motor brushes from being released into the atmosphere. The clean air is exhausted to atmosphere via a clean air outlet 28.

A cover portion 30 is hingedly attached to the chassis 12 about a hinge 32 to provide access to the pre-motor filter housing 24 so that the pre-motor filter can be replaced periodically. The cover portion 30 also releases the cyclonic separating apparatus to allow it to be removed from the chassis 12 for emptying purposes as and when necessary. The cover portion 30 includes the offtake conduit 22 and a carrying handle 34.

Having described the basic structure and operation of the vacuum cleaner 10, the cyclonic separating apparatus 50 will now be described in more detail with reference to FIG. 3. It will be appreciated that the separating apparatus itself, ie the cyclone arrangement, is known and details can be found in, inter alia, EP 0134 654B. Essentially, the cyclonic separation apparatus 50 comprises an outer cyclone 52 and an inner cyclone 54. The outer cyclone comprises a generally cylindrical container or bin 56 having a side wall **56*a*, a base 56*b* and a tangential inlet 58. The inner cyclone 54 comprises a frusto-conical cyclone body 60 depending from an upper surface 62 of the separating apparatus 50 The inner cyclone 54 has a cone opening 64 at the lower end thereof and a tangential inlet 66. Depending between the side wall 56*a* of the outer cyclone 52 and the inner cyclone body 60 is a shroud 68 which is substantially cylindrical in shape and includes a multiplicity of perforations 70 within a cylindrical band 68*a* of the shroud 68. The shroud 68 is supported by way of a flange 68*a* extending between the shroud 68 and an upper portion of the outer cyclone 52. The shroud 68 is also sealed to the outer surface of the cyclone body 60 at the lower end of the shroud 68. The upper part of the interior of the shroud 68 communicates with the tangential inlet 66. Below the shroud 68, a fine dust collector 72 is positioned so that it surrounds the cone opening 64. The fine dust collector 72 is sealed to the base 56*b* of the container 56 and also to the cyclone body 60 so that a closed collector is formed around the cone opening 64. A cylindrical vortex finder 74 is positioned centrally of the upper surface 62 so that it extends into the interior of the inner cyclone 54 along the axis of the frusto-conical cyclone body 60**.

In use, as will be understood from the prior art, dirty air enters the cyclonic separating apparatus 50 via the tangential inlet 58. The tangential nature of the inlet 58 forces the incoming air to follow a spiral path in a swirling motion around the interior surface of the container 56 so that larger dirt and fluff particles become separated from the airflow and collect in the lower area of the container 56 on top of the fine dust collector 72. The airflow moves inwardly towards the upper portion of the fine dust collector 72 and then travels, still swirling, up the outer surface of the shroud 68. The airflow then travels through the perforations 70 in the shroud 68 and is then introduced to the interior of the inner cyclone 54 via the tangential inlet 66. The tangential nature of this inlet 66 also forces the airflow to follow another spiral path inside the cyclone body 60. The frusto-conical shape of the cyclone body 60 causes the velocity of the airflow to increase as it travels down the cyclone body 60 and the high speeds attained by the airflow allow very small particulates of dirt and dust to be separated from the airflow and collected in the fine dust collector 72. The clean airflow then forms a vortex substantially along the longitudinal axis of the cycone body 60 which exits the inner cyclone 54 by way of the vortex finder 74.

As has been stated, the construction and operation of such separation apparatus is well known and the finer details need not be described any further. The invention lies in the vortex finder 74 and the offtake conduit 22 located immediately downstream of the vortex finder 74. The invention is therefore applicable to any cyclonic separating apparatus having a frusto-conical cyclone body in which a vortex is created and in which the exiting air is carried out of the apparatus via a vortex finder.

Figure 3:
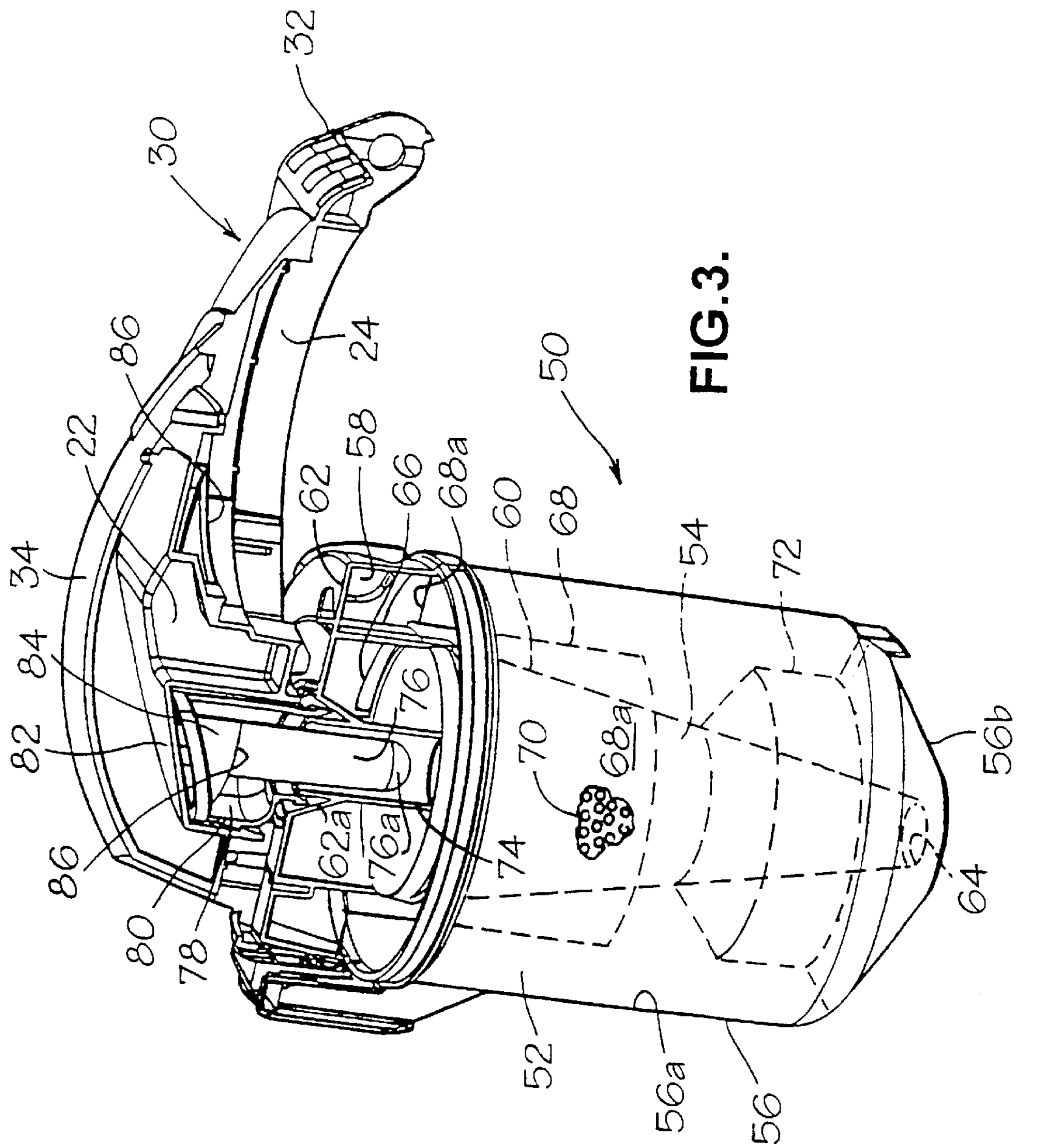
FIG. 3 is a partially cut-away view of part of the vacuum cleaner of FIG. 1, including the cyclonic separating apparatus.

As can be seen from FIG. 3, the vortex finder 74 is cylindrical and depends from the upper surface 62 into the inner cyclone 54 by means of an inclined support wall **62*a*. The vortex finder 74 also extends upwardly from the support wall 62*a* so that the vortex finder 74 terminates in a plane level with the upper surface 62, although this is not critical. Extending along the central axis of the vortex finder 74 is a centerbody 76 which is generally cylindrical but may taper slightly from the upper end towards the lower end. The centerbody 74 has a hemispherical distal end 76***a* which terminates within the vortex finder 74 without extending beyond the lower end thereof. Again, this is not critical. The vortex finder 74 communicates with a chamber 78 located immediately above the vortex finder 74 and at the upstream end of the tangential offtake conduit 22. The chamber has an arcuate outer wall 80 which has a generally spiral shape so that the chamber 78 communicates with the tangential offtake 22 in the manner of a scroll.

The centerbody 76 is formed integrally with a support portion 84 which is shaped so as to fit inside the upper end of the chamber 78 and to abut against the roof of the chamber 78. The support portion 84 defines the upper boundary of the chamber 78 and also provides support for the centerbody 76. The shape of the lower surface 86 of the support portion 84 is generally helical to form a scroll with a roughly constant cross-sectional area and is contiguous with the tangential offtake conduit 22. The tangential offtake conduit 22 communicates with the chamber 78 in a scroll-like manner and then follows a path which increases in distance from the cone opening 64 in the direction of the airflow. The tangential offtake conduit 22 is also slightly arcuate in plan view as can be seen from FIG. 2. After a predetermined distance, the portion of the tangential offtake conduit 22 ceases to increase in distance from the cone opening 64 and is then directed towards the housing 24 of the pre-motor filter. The tangential offtake conduit 22, opens into the housing 24 at an inlet 88.

Figure 4:
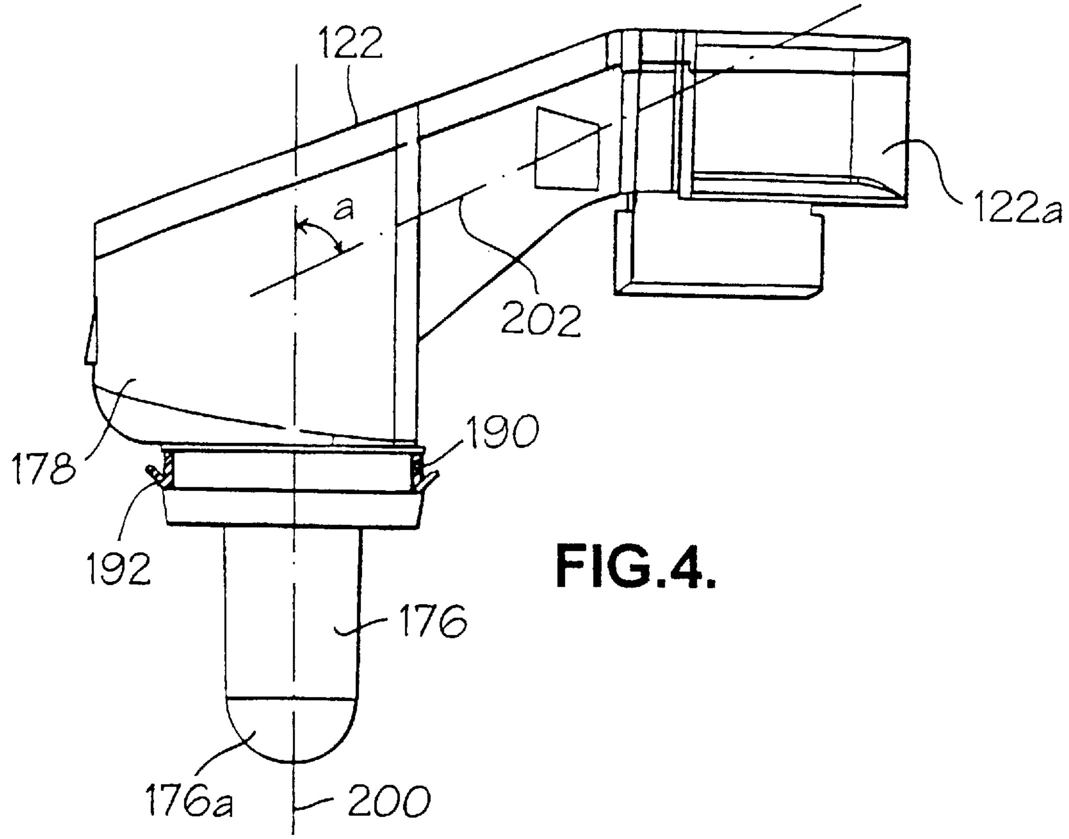
FIG. 4 is a side view of a tangential offtake conduit and centerbody forming part of cyclonic separating apparatus according to the invention.
Figure 5:
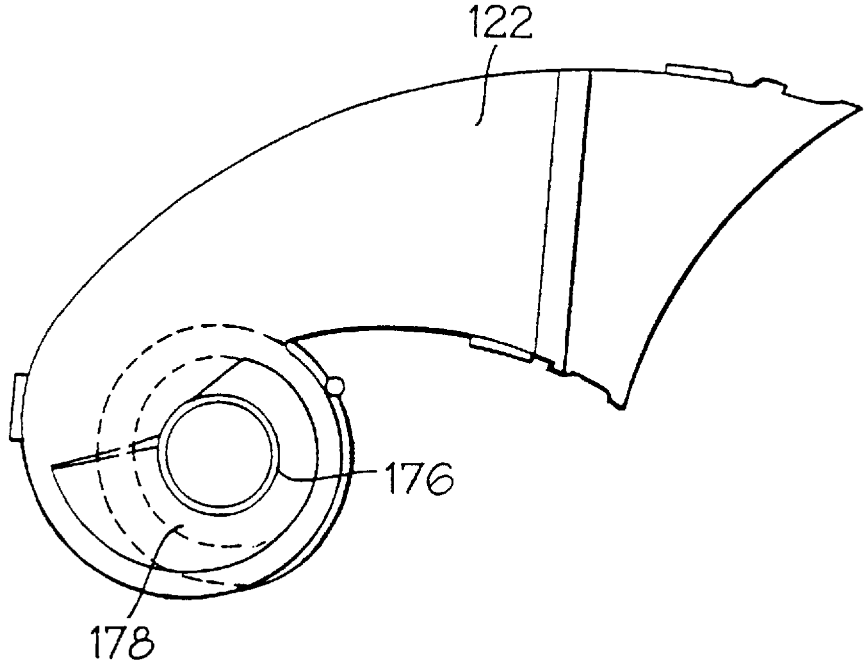
FIG. 5 is a plan view of the tangential offtake conduit and centerbody of FIG. 4.

A helical offtake conduit 122 suitable for use in the vacuum cleaner 10 of FIGS. 1 and 2 is shown in isolation in FIGS. 4 and 5. Also shown are the chamber 178 and the centerbody 176 which form part of the same constructional piece. The centerbody 176 projects along an axis 200 which is, in use, coaxial with the axis of the vortex finder 74 shown in FIG. 3. A cylindrical neck 190 surrounds the centerbody 176 and carries a seal 192 which, in use, abuts against the upper lip of the vortex finder 74 to form a seal therewith. The neck 190 opens into the chamber 178 which, as can be seen from FIG. 5, is spiral in shape so as to allow the tangential offtake conduit 122 to communicate with the chamber 178 in a scroll-manner. The tangential offtake conduit 122 then leaves the chamber 178 at an acute angle with respect to the axis 200 of the centerbody. The tangential offtake conduit 122 has a central axis 202 which meets the axis 200 at an angle a which is ideally about 60° but can vary between 35° and 70°. The distance (measured parallel to the axis 200) between the tangential offtake conduit 122 and the hemi-spherical end 176*a* of the centerbody 176 increases with distance along the tangential offtake conduit 122. The arcuate shape of the tangential offtake conduit 122 can be seen clearly in FIG. 5. The distal end 122*a* of the conduit 122 is shaped and arranged to communicate directly with the pre-motor filter housing 24 (see FIG. 1). A seal can be arranged around the open mouth of the distal end 122*a* of the conduit 122 if desired.

When fluid leaves the cyclonic separating apparatus 50 shown in FIG. 3 via the vortex finder 74, it is spinning with a high angular velocity. The angular velocity is still very high as the fluid flow enters the chamber 78. However, the scroll-like connection between the tangential offtake conduit 22 and the chamber 78 allows the spinning fluid to enter the offtake conduit 22 in a tangential manner and to progress along the offtake conduit 22 as a linear flow. The helical shape of the lower surface 86 of the support portion 84 guides the spinning fluid into the open end of the tangential offtake conduit 22. Furthermore, because the tangential offtake conduit 22 is inclined to the axis of the vortex finder 74 and thereby increases in its distance from the cone opening 64 in the downstream direction, the fluid flow is not turned through a sharp 90° bend which means that less turbulence than would otherwise be the case is induced in the flow. The helical formation of the offtake conduit 22 provides a smooth path for the fluid exiting the separating apparatus so that as much as possible of the kinetic energy of the spinning fluid is recovered as pressure energy. This energy recovery results in a higher efficiency of the apparatus overall.

It will be appreciated that a helical or inclined tangential offtake can be applied to any situation where separation takes place in a cyclone with a vortex finder providing the outlet for the fluid. The application to a vacuum cleaner is described above but the invention is not to be regarded as limited to such an application. Other applications are envisaged such as other types of separation or filtration system for separating particulates from a fluid, eg. diesel exhaust systems and air conditioning systems.

What is claimed is:

1. Cyclonic separating apparatus comprising a tapering cyclone having an axis, a larger end and a smaller end, a fluid inlet and a fluid outlet located at the larger end of the cyclone, the fluid outlet being located coaxially with the cyclone, and a tangential offtake conduit communicating with the fluid outlet, wherein the distance, measured parallel to the axis, between the tangential offtake conduit and the smaller end of the cyclone increases in the downstream direction of the tangential offtake conduit and the tangential offtake conduit follows a helical path downstream of the fluid outlet.

2. Cyclonic separating apparatus as claimed in claim 1, wherein the tangenital offtake conduit is inclined at an angle of between 35° and 70° to the longitudinal axis of the cyclone body.

3. Cyclonic separating apparatus as claimed in claim 2, wherein the tangential offtake conduit has a central axis which is inclined at an angle of between 50° and 65° to the longitudinal axis of the cyclone body.

4. Cyclonic separating apparatus as claimed in claim 3, wherein the central axis is inclined at an angle of substantially 60° to the longitudinal axis of the cyclone body.

5. Cyclonic separating apparatus as claimed in claim 1, wherein the fluid outlet consists of a vortex finder.

6. Cyclonic separating apparatus as claimed in claim 1, wherein a centerbody is located in the fluid outlet.

7. Cyclonic separating apparatus as claimed in claim 6, wherein the tangential offtake conduit communicates with an annular chamber delimited on the outside by the fluid outlet and on the inside by the centerbody.

8. A vacuum cleaner incorporating a cyclonic separating apparatus comprising a tapering cyclone having an axis, a larger end and a smaller end, a fluid inlet and a fluid outlet located at the larger end of the cyclone, the fluid outlet being located coaxially with the cyclone, and a tangential offtake conduit communicating with the fluid outlet, wherein the distance, measured parallel to the axis, between the tangential offtake conduit and the smaller end of the cyclone increases in the downstream direction of the tangential offtake conduit.

9. The vacuum cleaner according to claim 8, wherein the cyclonic separating apparatus is adapted to separate dirt and dust particles from air flow.

10. The vacuum cleaner according to claim 8, wherein the tangential offtake conduit communicates with a pre-motor filter located immediately upstream of a motor and fan unit.

11. The vacuum cleaner according to claim 8, wherein the tangential offtake conduit follows a helical path downstream of the fluid outlet.

12. The vacuum cleaner according to claim 11, wherein the tangential offtake conduit is inclined at an angle of between 35° and 70° to the axis of the cyclone body.

13. The vacuum cleaner according to claim 11, wherein the tangential offtake conduit has a central axis inclined at an angle of between 50° and 65° to the axis of the cyclone body.

14. The vacuum cleaner according to claim 11, wherein the tangential offtake conduit is inclined at an angle of about 60° to the axis of the cyclone body.

15. The vacuum cleaner according to claim 11, wherein the fluid outlet includes a vortex finder.

16. The vacuum cleaner according to claim 11, wherein a centerbody is located in the fluid outlet.

17. The vacuum cleaner according to claim 16, wherein the tangential offtake conduit communicates with an annular chamber delimited on the outside by the fluid outlet and on the inside by the centerbody.

* * * * *